United States Patent

[11] 3,609,425

[72] Inventor Francis R. Sheridan
170-23 Pacific Ave., Spanaway, Wash. 98387
[21] Appl. No. 26,324
[22] Filed Apr. 7, 1970
[45] Patented Sept. 28, 1971

[54] RECIPROCATING MAGNET MOTOR
6 Claims, 2 Drawing Figs.

[52] U.S. Cl. .................................................. 310/103, 251/65
[51] Int. Cl. ..................................................... H02k 49/10
[50] Field of Search ............................................ 310/80, 103, 104; 251/65

[56] References Cited
UNITED STATES PATENTS

| | | | |
|---|---|---|---|
| 3,071,340 | 1/1963 | Nixon ........................ | 251/65 |
| 3,326,236 | 6/1967 | Beckett et al. ............ | 251/65 X |
| 3,348,543 | 10/1967 | Stafford .................... | 251/65 X |
| 3,391,289 | 7/1968 | Danilewicz et al. ...... | 310/103 X |
| 3,483,412 | 12/1969 | Bakker et al. ............ | 310/103 |

Primary Examiner—D. F. Duggan
Attorney—Eugene D. Farley

ABSTRACT: A reciprocating magnetic actuator comprises first and second magnets and mounting means mounting the same in fixed, spaced, aligned relation with unlike poles facing each other. First guide means are interposed between and aligned with the first and second magnets. A third magnet is freely reciprocatable therein, being aligned with the first and second magnets and arranged with its poles facing unlike poles thereof. Stops at each end of the first guide means arrest the reciprocation of the third magnet at predetermined travel limits. Fourth and fifth magnets are interposed between the stops and the first and second magnets respectively. They are arranged substantially normal to the latter with like poles facing the like poles of the third magnet. Reciprocating drive means advance the fourth and fifth magnets alternately into the fields of force of the third magnet, thereby causing its reciprocation in the guide means. The force thus generated is used to drive a selected appliance through a power takeoff carried by the third magnet.

Francis R. Sheridan
INVENTOR

RECIPROCATING MAGNET MOTOR

This invention relates to reciprocating actuators. It pertains particularly to reciprocating, magnet-driven actuators.

Although many types of actuators heretofore have been devised, the need exists for reciprocating actuators, or reciprocating power transmission, which operates without communication or interconnection with any outside power source whatsoever, including sources of electrical power.

It is the general purpose of the present invention to provide such a reciprocating actuator, or power transmission, which operates by the interplay of magnetic forces, which is simple in its construction, reliable in operation, and adaptable to driving or controlling a multiplicity of diverse contrivances.

The reciprocating actuator accomplishing the foregoing and other purposes and objects illustrated in the accompanying drawings wherein.

Figures 1, 2:
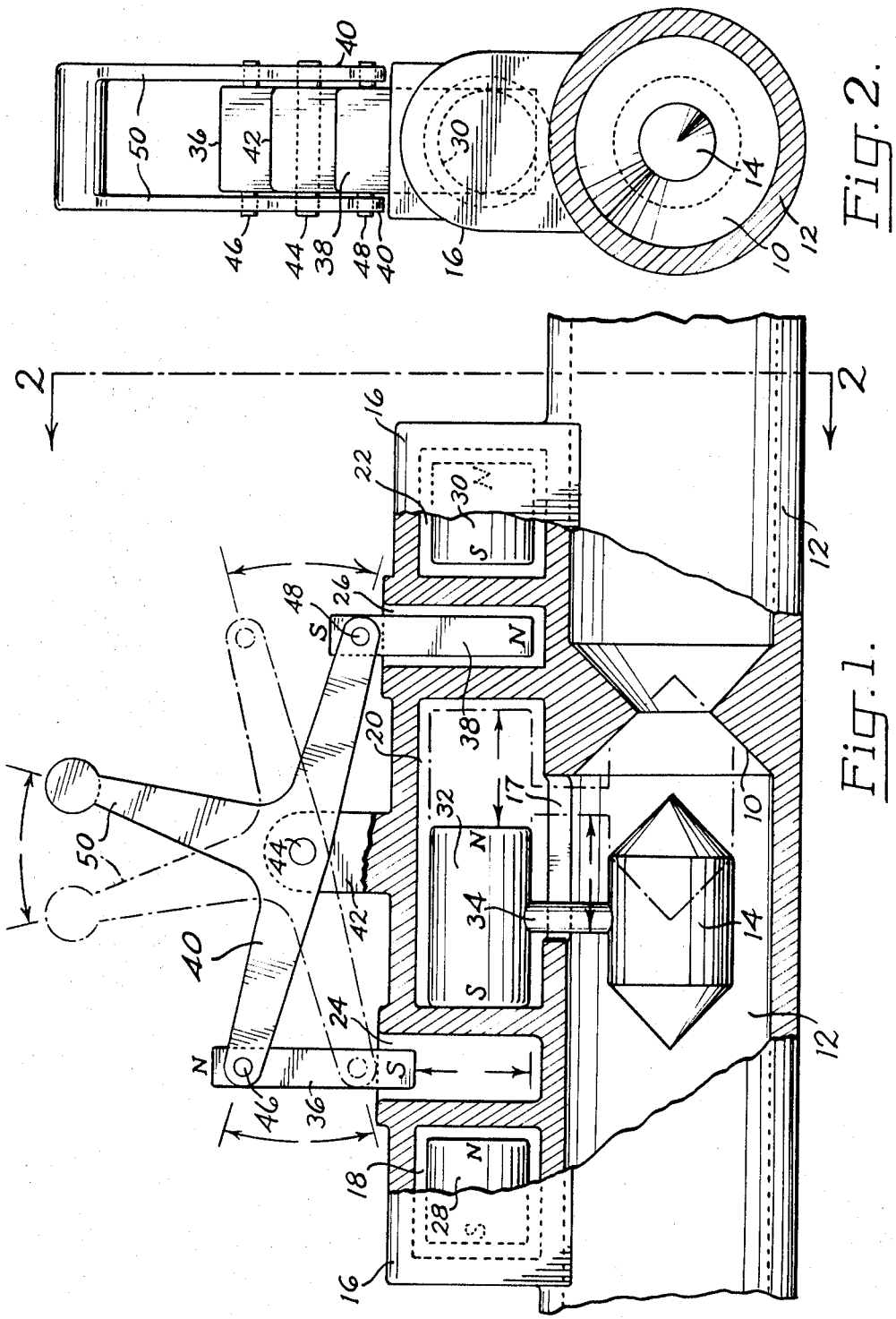
FIG. 1 is a longitudinal sectional view of the actuator.
FIG. 2 is a transverse sectional view thereof, taken along line 2—2 of FIG. 1.

The reciprocating magnet actuator of my invention broadly includes a reciprocating magnet interposed between and aligned with a pair of fixed magnets a spaced distance therefrom. Two additional magnets are mounted for driven reciprocation alternately into an advanced position wherein they intercept the fields of force of the fixed and reciprocating magnets. The polarity of the magnets is arranged so that the reciprocating magnet normally is shifted toward one or the other of the fixed magnets. However, upon interposing one of the driven magnets, the reciprocating magnet is driven to its alternate position. Thus by alternating the application of the magnetic forces of the reciprocating magnets, a corresponding reciprocation can be induced in the reciprocating magnet. Suitable power takeoff means are connected to the latter to enable application of the resulting force to driving a suitable appliance.

Considering the foregoing in greater detail and with particular reference to the drawings:

The reciprocating magnet actuator of my invention may be applied to a diversity of uses wherein it is described to drive or control an appliance without a physical or electrical connection between the appliance and an external source of power. It thus may be applied to the driving of a pump, the setting of a valve, the actuation of an electric switch, or other purpose. In the present invention, it is illustrated in its application to the opening and closing of a needle valve 10 controlling the flow of gas or liquid through a conduit 12.

It is the end object of the application of the actuator to shift the position of the needle member 14 of the valve between a retracted position in which the valve is open and an advanced position in which the valve is closed.

This purpose is accomplished by providing a reciprocating magnet actuator, the construction of which is particularly illustrated in FIG. 1.

The actuator is housed in a casing 16 which is located over a slot 17 in conduit 12. The housing is made of nonmagnetic material and contains three aligned chambers 18, 20, 22. It also is formed with a pair of recesses 24, 26 interposed between the intermediate and outside chambers. These chambers and recesses house magnets, the action of which accomplishes the purposes of the invention.

Thus chambers 18, 22 house fixed magnets 28, 30. These are placed in axial alignment with opposite poles facing each other.

Chamber 20 houses a sliding, reciprocatable magnet 32 for which it serves as a guide. Chamber 20 communicates with conduit 12 via slot 17. Magnet 32 mounts a power takeoff arm 34 which connects it with valve needle 14.

Reciprocation of magnet 32 thus will reciprocate corresponding valve needle 14, opening and closing the valve in the desired manner.

The reciprocation of magnet 32 within limits determined by the end walls of chamber 20, which serves as stops, is brought about by the action of driven magnets 36, 38.

The latter magnets work in recesses 24, 26, 34. In their advanced position they intercept the fields of force which exist between the facing poles of magnets 28, 30 and 32. In their retracted position, they are withdrawn from the fields of force and do not exert an appreciable effect upon them. In the illustrated form of the invention magnets 36 and 38 are arranged in such a manner that when they are in their advanced positions, aligned with reciprocating magnet 32, the adjacent poles of the two magnets are unlike.

Drive means are provided for alternately advancing and retracting magnets 36, 38 in recesses 24, 26.

In the illustrated embodiment, the drive means comprises a rocker arm 40 pivotally mounted on standard 42 by means of a pivot pin 44. The ends of the rocker arm pivotally are connected to magnets 36, 38 by pivot arms 46, 48, respectively. A hand-operated lever 50 is connected to the rocker arm so that it may be adjusted between its full line and dotted line positions of FIG. 1. Alternatively, however, the rocker arm may be adjusted between its two positions by a suitable mechanical or electrical drive.

To enable operation of the device, the polarity of all five magnets is arranged so that when a given one of magnets 36, 38 is in its advanced position, reciprocating magnet 32 assumes a given position with respect to fixed magnets 28, 30. However, when the given magnet is retracted and the other is advanced, the reciprocating magnet 32 moves to the opposite side of the chamber in which it is housed. Thus by alternately advancing and retracting magnets 36, 38, a reciprocating motion may be induced in magnet 32, the limits of travel being determined by the end walls of chamber 20 in which the magnet is housed. In the illustrated form of the invention, reciprocatable magnet 32 is arranged with unlike poles facing fixed magnets 28, 30. Accordingly the reciprocatable magnet will be attracted to one or the other of the fixed magnets, normally the one to which it is closest. The polarity of adjustable magnets 36, 38 is such that when one of them is interposed between the fixed and reciprocatable magnet, a pair of opposite poles is present which causes the reciprocatable magnet to move away from the adjustable magnet in the direction of the opposite fixed magnet. This movement is reinforced and augmented by the attractive polarity which exists between reciprocating magnet 32 and the remote fixed magnet.

In this manner reciprocation of magnet 32 is obtained, either one cycle at a time by manual operation, or rhythmically by motor operation of lever 50. This reciprocation motion in turn is transmitted to a driven member such as valve 14, without the presence of any physical or electrical interconnection whatsoever between driven element 14 and driving element 50.

Having thus described my invention in preferred embodiments, I claim as new and desire to protect by letters patent:

1. A reciprocating magnetic actuator comprising
   a. first and second magnets,
   b. mounting means mounting the first and second magnets in fixed, spaced, aligned relation, with unlike poles facing each other,
   c. guide means of nonmagnetic material interposed between and aligned with the first and second magnets,
   d. a third magnet freely reciprocatable in the guide means, aligned with the first and second magnets and arranged with its poles facing unlike poles of the first and second magnets,
   e. stop means of nonmagnetic material at each end of the guide means arranged to arrest the reciprocation of the third magnet at predetermined travel limits,
   f. fourth and fifth magnets interposed between the stop means and the first and second magnets, respectively, and arranged with like poles opposite the like poles of the third magnet,
   g. and drive means connected to the fourth and fifth magnets for reciprocating them alternately between advanced positions wherein they intercept the fields of force of the first and third and second and third magnets, respectively, and retracted positions wherein they are removed from such fields of force, h. the fourth and fifth magnets alternately adjusting the third magnet when they are in their advanced positions, thereby inducing a reciprocating movement in the third magnet, and i. power takeoff means connected to the third magnet for transmitting its reciprocating movement to a driven member.

2. The reciprocating magnetic actuator of claim 1 including guide means interposed between the stop means and the first and second magnets and arranged in a plane substantially normal thereto and housing the fourth and fifth magnets respectively.

3. The reciprocating magnetic actuator of claim 1 wherein the drive means for the fourth and fifth magnets comprises rocker arm means and pivotal connecting means connecting one end of the rocker arm to the fourth magnet and the other end of the arm to the fifth magnet.

4. The reciprocating magnetic actuator of claim 1 including a housing including three aligned chambers, the two outside chambers mounting the first and second magnets and the intermediate chamber mounting the third magnet, the third magnet having a power takeoff arm, and the intermediate chamber having a slot guiding the movement of the arm with reciprocation of the third magnet.

5. The reciprocating magnetic actuator of claim 4 wherein the housing includes a pair of recesses interposed respectively between the first and second chamber and the second and third chamber, the recess providing guideways for the fourth and fifth magnets, the end walls of the intermediate chamber acting as the stop means for the third magnet.

6. A reciprocating magnetic actuator comprising:

a. a guide of nonmagnetic material, b. a magnet freely reciprocatable in the guide, c. stop means of nonmagnetic material arranged at each end of the guide to arrest the reciprocation of the magnet at predetermined travel limits, d. a pair of additional magnets arranged outside the stop means at each end of the first named magnet, in the field of force thereof, e. drive means connected to the said pair of additional magnets for reciprocating each of them alternately with the other between an advanced position wherein it intercepts the field at one of the respective ends of the first named magnet, and a retracted position wherein it is removed from such field of force, thereby inducing a reciprocating movement in the first named magnet in the guide, and f. power takeoff means connected to the first named magnet for transmitting its reciprocating movement to a driven member.